(12) United States Patent
Frache et al.

(10) Patent No.: US 11,820,889 B2
(45) Date of Patent: *Nov. 21, 2023

(54) FLUOROPOLYMER HYBRID COMPOSITE

(71) Applicant: SOLVAY SA, Brussels (BE)

(72) Inventors: Alberto Frache, Alessandria (IT); Julio A. Abusleme, Saronno (IT); Alberto Cisternino, Rivoli (IT); Christine Hamon, Bollate (IT); Giambattista Besana, Mariano Comense (IT); Ségolène Brusseau, Tavaux (FR); Matteo Lavaselli, Momperone (IT); Giovanni Camino, Turin (IT)

(73) Assignee: Solvay SA, Brussels (BE)

( * ) Notice: Subject to any disclaimer, the term of this patent is extended or adjusted under 35 U.S.C. 154(b) by 979 days.

This patent is subject to a terminal disclaimer.

(21) Appl. No.: 16/612,984

(22) PCT Filed: May 8, 2018

(86) PCT No.: PCT/EP2018/061937
§ 371 (c)(1),
(2) Date: Nov. 12, 2019

(87) PCT Pub. No.: WO2018/206612
PCT Pub. Date: Nov. 15, 2018

(65) Prior Publication Data
US 2020/0172728 A1    Jun. 4, 2020

(30) Foreign Application Priority Data

May 12, 2017 (EP) .................. 17305539

(51) Int. Cl.
| | | |
|---|---|---|
| *C08L 71/02* | (2006.01) | |
| *C08J 3/20* | (2006.01) | |
| *C08J 5/18* | (2006.01) | |
| *H01M 50/446* | (2021.01) | |

(52) U.S. Cl.
CPC .............. *C08L 71/02* (2013.01); *C08J 3/201* (2013.01); *C08J 5/18* (2013.01); *H01M 50/446* (2021.01); *C08J 2371/02* (2013.01); *C08J 2427/16* (2013.01); *C08J 2433/10* (2013.01); *C08L 2203/20* (2013.01); *C08L 2203/204* (2013.01)

(58) Field of Classification Search
CPC .................... C08L 27/12–24; C08L 71/00–02
See application file for complete search history.

(56) References Cited

U.S. PATENT DOCUMENTS 10,982,062 B2 *   4/2021   Abusleme .......... H01M 50/431
2015/0284519 A1   10/2015  Frache et al.

FOREIGN PATENT DOCUMENTS

| JP | 2015-520781 A | 7/2015 |
| JP | 2015-537077 A | 12/2015 |
| JP | 2016-501950 A | 1/2016 |
| JP | 2018-0525442 A | 9/2018 |
| WO | WO 2017085101 A1 * | 5/2017 |

OTHER PUBLICATIONS

Office Action issued in corresponding Japanese Application No. 2019-562310, dated May 10, 2022 (10 pages).

Zhigang Xue et al., "Poly(ethylene oxide)-based electrolytes for lithium-ion batteries", Journal of Materials Chemistry A: Materials for Energy and Sustainability, 2015, vol. 3, No. 38, pp. 19218-19253.

* cited by examiner

*Primary Examiner* — Ana L. Woodward
(74) *Attorney, Agent, or Firm* — Osha Bergman Watanabe & Burton LLP

(57) ABSTRACT

The present invention pertains to a fluoropolymer hybrid organic/inorganic composite, to a film comprising said fluoropolymer hybrid organic/inorganic composite and to uses of said film in various applications, especially in electrochemical and in photo-electrochemical applications.

20 Claims, No Drawings

FLUOROPOLYMER HYBRID COMPOSITE

CROSS-REFERENCE TO RELATED APPLICATION

This application is a U.S. national stage entry under 35 U.S.C. § 371 of International Application No. PCT/EP2018/061937 filed May 8, 2018, which claims priority to European application No. 17305539.3 filed May 12, 2017. The entire contents of these applications are explicitly incorporated herein by this reference.

TECHNICAL FIELD

The present invention pertains to a fluoropolymer hybrid organic/inorganic composite, to a film comprising said fluoropolymer hybrid organic/inorganic composite and to uses of said film in various applications, especially in electrochemical and in photo-electrochemical applications.

BACKGROUND ART

Lithium metal polymer (LMP) batteries are known in the art wherein the anode is a Li metal foil and the separator is an electrolyte solid polymer blend of a poly(alkylene oxide) with a fluoropolymer, preferably a vinylidene fluoride polymer, incorporating an electrolytic salt.

These separators are typically obtained by film extrusion. Unfortunately, one drawback of this technology is the low ionic conductivity of the separators so obtained at temperatures below 80° C.

A challenge in this field is thus to enhance ionic conductivity of these separators to make extrusion technologies more attractive, while providing safe separators ensuring good separation of the electrodes.

SUMMARY OF INVENTION

It has been now found that the process of the invention represents a flexible and easy alternative to the processes known in the art for manufacturing dense films endowed with outstanding ionic conductivity and thus suitable for use in electrochemical and in photo-electrochemical applications such as separators in electrochemical devices.

In a first instance, the present invention pertains to a process for manufacturing a fluoropolymer hybrid organic/inorganic composite [composite (FH)], said process comprising:
  (i) providing a pre-composite [pre-composite (FP)] by processing in molten phase, preferably extruding:
  a pre-gel compound [compound (MP)] obtainable by at least partial hydrolysis and/or polycondensation, in the presence of a liquid medium, of at least one metal compound [compound (M)] of formula (I):

$$X_{4-m}M(OY)_m \qquad (I)$$

wherein M is a metal selected from the group consisting of Si, Ti and Zr, X and Y, equal to or different from each other and at each occurrence, are selected from hydrocarbon groups, optionally comprising one or more functional groups, and m is an integer comprised between 1 and 4, and
  at least one functional fluoropolymer comprising at least one hydroxyl group [polymer (FF)];
  (ii) providing a composition by compounding the pre-composite (FP) provided in step (i) with:
  at least one poly(alkylene oxide) (PAO) of formula (II):

$$HO—(CH_2CHR_AO)_n—R_B \qquad (II)$$

wherein $R_A$ is a hydrogen atom or a $C_1$-$C_5$ alkyl group, $R_B$ is a hydrogen atom or a —$CH_3$ alkyl group and n is an integer comprised between 2000 and 40000, preferably between 4000 and 35000, more preferably between 11500 and 30000,
  at least one metal salt [salt (M)],
  optionally, at least one fluoropolymer [polymer (F)], equal to or different from the polymer (FF), and
  optionally, one or more inorganic fillers; and
  (iii) processing in molten phase, preferably extruding the composition provided in step (ii).

The pre-composite (FP) provided in step (i) of the process for manufacturing the composite (FH) of the invention is typically in the form of pellets. The pre-composite (FP) is preferably post-treated, preferably at a temperature higher than 100° C. and of at most 170° C., typically during a period comprised between 10 minutes and 24 hours.

The composition provided in step (ii) of the process for manufacturing the composite (FH) of the invention is processed in molten phase, typically using an extruder, preferably a twin screw extruder.

In a second instance, the present invention pertains to a fluoropolymer hybrid organic/inorganic composite [composite (FH)].

The composite (FH) is advantageously obtainable by the process of the invention.

The composite (FH) is typically in the form of pellets.

The composite (FH) typically comprises, preferably consists of:
  at least one pre-composite [pre-composite (FP)],
  at least one poly(alkylene oxide) (PAO) of formula (II):

$$HO—(CH_2CHR_AO)_n—R_B \qquad (II)$$

wherein $R_A$ is a hydrogen atom or a $C_1$-$C_5$ alkyl group, $R_B$ is a hydrogen atom or a —$CH_3$ alkyl group and n is an integer comprised between 2000 and 40000, preferably between 4000 and 35000, more preferably between 11500 and 30000,
  at least one metal salt [salt (M)],
  optionally, at least one fluoropolymer [polymer (F)], equal to or different from the polymer (FF), and
  optionally, one or more inorganic fillers.

The composite (FH) of the invention is particularly suitable for use in a process for manufacturing a film.

Thus, in a third instance, the present invention pertains to a process for manufacturing a film, said process comprising processing in molten phase at least one composite (FH).

The process for manufacturing a film according to the invention advantageously comprises processing in molten phase, typically using an extruder, preferably a single screw extruder, at least one composite (FH).

The film is typically manufactured by processing in molten phase at least one composite (FH) using film extrusion techniques such as cast film extrusion or blown film extrusion.

In a fourth instance, the present invention pertains to the film obtainable by the process of the invention.

The film of the invention typically comprises, preferably consists of, at least one composite (FH).

The film of the invention is typically a dense film.

For the purpose of the present invention, the term "dense" is intended to denote a film free from pores.

The film of the invention typically has a thickness comprised between 2 μm and 300 μm, preferably between 5 μm and 100 μm, more preferably between 10 μm and 40 μm.

In a fifth instance, the present invention pertains to an electrochemical device or a photo-electrochemical device comprising at least one film of the invention.

The film of the invention is suitable for use in electrochemical devices or in photo-electrochemical devices.

Non-limiting examples of suitable electrochemical devices include secondary batteries, preferably Lithium-ion batteries.

The film of the invention may be advantageously used for the manufacture of components for electrochemical devices, preferably for secondary batteries.

The film of the invention is particularly suitable for use as separator for electrochemical devices, preferably for secondary batteries, more preferably for Lithium-ion batteries.

For the purpose of the present invention, the term "fluoropolymer [polymer (F)]" is intended to denote a fluoropolymer comprising recurring units derived from at least one fluorinated monomer.

The polymer (F) may further comprise recurring units derived from at least one hydrogenated monomer.

The polymer (FF) is typically a polymer (F) further comprising recurring units derived from at least one functional monomer comprising at least one hydroxyl group [monomer (OH)].

The polymer (FF) typically comprises recurring units derived from at least one fluorinated monomer and from at least one functional monomer comprising at least one hydroxyl group [monomer (OH)].

By the term "fluorinated monomer", it is hereby intended to denote an ethylenically unsaturated monomer comprising at least one fluorine atom.

By the term "hydrogenated monomer", it is hereby intended to denote an ethylenically unsaturated monomer comprising at least one hydrogen atom and free from fluorine atoms.

The term "at least one fluorinated monomer" is understood to mean that the fluoropolymer may comprise recurring units derived from one or more than one fluorinated monomers. In the rest of the text, the expression "fluorinated monomers" is understood, for the purposes of the present invention, both in the plural and the singular, that is to say that they denote both one or more than one fluorinated monomers as defined above.

The term "at least one hydrogenated monomer" is understood to mean that the fluoropolymer may comprise recurring units derived from one or more than one hydrogenated monomers. In the rest of the text, the expression "hydrogenated monomers" is understood, for the purposes of the present invention, both in the plural and the singular, that is to say that they denote both one or more than one hydrogenated monomers as defined above.

The term "at least one monomer (OH)" is understood to mean that the fluoropolymer may comprise recurring units derived from one or more than one monomers (OH). In the rest of the text, the expression "monomer (OH)" is understood, for the purposes of the present invention, both in the plural and the singular, that is to say that they denote both one or more than one monomers (OH) as defined above.

The monomer (OH) of the polymer (FF) may be selected from the group consisting of fluorinated monomers comprising at least one hydroxyl group and hydrogenated monomers comprising at least one hydroxyl group.

Should the fluorinated monomer comprise at least one hydrogen atom, it is designated as hydrogen-containing fluorinated monomer.

Should the fluorinated monomer be free of hydrogen atoms, it is designated as per(halo)fluoromonomer.

The fluorinated monomer may further comprise one or more other halogen atoms (Cl, Br, I).

Non-limiting examples of suitable fluorinated monomers include, notably, the followings:

- $C_3$-$C_8$ perfluoroolefins, such as tetrafluoroethylene and hexafluoropropylene;
- $C_2$-$C_8$ hydrogenated fluoroolefins, such as vinylidene fluoride, vinyl fluoride, 1,2-difluoroethylene and trifluoroethylene;
- perfluoroalkylethylenes of formula $CH_2=CH-R_{f0}$, wherein $R_{f0}$ is a $C_1$-$C_6$ perfluoroalkyl group;
- chloro- and/or bromo- and/or iodo-$C_2$-$C_6$ fluoroolefins, such as chlorotrifluoroethylene;
- (per)fluoroalkylvinylethers of formula $CF_2=CFOR_{f1}$, wherein $R_{f1}$ is a $C_1$-$C_6$ fluoro- or perfluoroalkyl group, e.g. $CF_3$, $C_2F_5$, $C_3F_7$;
- $CF_2=CFX_0$ (per)fluoro-oxyalkylvinylethers, wherein $X_0$ is a $C_1$-$C_{12}$ alkyl, or a $C_1$-$C_{12}$ oxyalkyl, or a $C_1$-$C_{12}$ (per)fluorooxyalkyl group comprising one or more ether groups, such as perfluoro-2-propoxy-propyl group;
- (per)fluoroalkylvinylethers of formula $CF_2=CFOCF_2OR_{f2}$, wherein $R_{f2}$ is a $C_1$-$C_6$ fluoro- or perfluoroalkyl group, e.g. $CF_3$, $C_2F_5$, $C_3F_7$ or a $C_1$-$C_6$ (per)fluorooxyalkyl group comprising one or more ether groups, such as $-C_2F_5-O-CF_3$;
- functional (per)fluoro-oxyalkylvinylethers of formula $CF_2=CFOY_0$, wherein $Y_0$ is a $C_1$-$C_{12}$ alkyl or (per)fluoroalkyl, or a $C_1$-$C_{12}$ oxyalkyl, or a $C_1$-$C_{12}$ (per)fluorooxyalkyl group comprising one or more ether groups and $Y_0$ comprises a carboxylic or sulfonic acid group, in its acid, acid halide or salt form; and
- fluorodioxoles, preferably perfluorodioxoles.

Should the fluorinated monomer be a hydrogen-containing fluorinated monomer, such as for instance vinylidene fluoride, trifluoroethylene, vinyl fluoride, the fluoropolymer comprises recurring units derived from said at least one hydrogen-containing fluorinated monomer and, optionally, from at least one other monomer.

Should the fluorinated monomer be a per(halo)fluoromonomer, such as for instance tetrafluoroethylene, chlorotrifluoroethylene, hexafluoropropylene, (per)fluoroalkylvinylethers, the fluoropolymer comprises recurring units derived from at least one per(halo)fluoromonomer and from at least one hydrogenated monomer.

Non-limiting examples of suitable hydrogenated monomers include, notably, ethylene, propylene, vinyl monomers such as vinyl acetate, and styrene monomers such as styrene and p-methylstyrene.

The polymer (F) comprises preferably more than 25% by moles, preferably more than 30% by moles, more preferably more than 40% by moles of recurring units derived from at least one fluorinated monomer.

The polymer (F) may comprise more than 1% by moles, preferably more than 5% by moles, more preferably more than 10% by moles of recurring units derived from at least one hydrogenated monomer.

The polymer (F) preferably comprises recurring units derived from at least one fluorinated monomer selected from the group consisting of vinylidene fluoride (VDF), tetrafluoroethylene (TFE) and chlorotrifluoroethylene (CTFE).

The polymer (F) is more preferably selected from the group consisting of fluoropolymers comprising recurring units derived from vinylidene fluoride (VDF) and, optionally, at least one fluorinated monomer different from VDF.

The polymer (F) preferably comprises recurring units derived from:
  (a) at least 60% by moles, preferably at least 75% by moles, more preferably at least 85% by moles of vinylidene fluoride (VDF), and
  (b) optionally, from 0.1% to 15% by moles, preferably from 0.1% to 12% by moles, more preferably from 0.1% to 10% by moles of a fluorinated monomer selected from the group consisting of vinyl fluoride, chlorotrifluoroethylene (CTFE), hexafluoropropylene (HFP), tetrafluoroethylene (TFE), trifluoroethylene (TrFE), perfluoromethylvinylether (PMVE) and mixtures therefrom.

The polymer (F) may be amorphous or semi-crystalline.

The term "amorphous" is hereby to denote a polymer (F) having a heat of fusion of less than 5 J/g, preferably of less than 3 J/g, more preferably of less than 2 J/g, as measured according to ASTM D-3418-08.

The term "semi-crystalline" is hereby intended to denote a polymer (F) having a heat of fusion of from 10 to 90 J/g, preferably of from 30 to 60 J/g, more preferably of from 35 to 55 J/g, as measured according to ASTM D3418-08.

The polymer (F) is preferably semi-crystalline.

The polymer (FF) preferably comprises at least 0.01% by moles, more preferably at least 0.05% by moles, even more preferably at least 0.1% by moles of recurring units derived from at least one monomer (OH) as defined above.

The polymer (FF) preferably comprises at most 20% by moles, more preferably at most 15% by moles, even more preferably at most 10% by moles, most preferably at most 3% by moles of recurring units derived from at least one monomer (OH) as defined above.

Determination of average mole percentage of monomer (OH) recurring units in the polymer (FF) can be performed by any suitable method. Mention can be notably made of acid-base titration methods or of NMR methods.

The monomer (OH) is typically selected from the group consisting of hydrogenated monomers comprising at least one hydroxyl group.

The monomer (OH) is preferably selected from the group consisting of (meth)acrylic monomers of formula (III) and vinylether monomers of formula (IV):

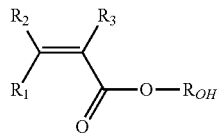

(III)

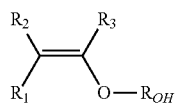

(IV)

wherein each of $R_1$, $R_2$ and $R_3$, equal to or different from each other, is independently a hydrogen atom or a $C_1$-$C_3$ hydrocarbon group, and $R_{OH}$ is a $C_1$-$C_5$ hydrocarbon group comprising at least one hydroxyl group.

The monomer (OH) is preferably of formula (III) as defined above.

The monomer (OH) is more preferably of formula (III'):

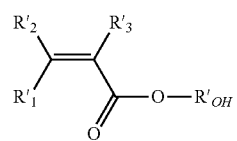

(III')

wherein $R'_1$, $R'_2$ and $R'_3$ are hydrogen atoms and R'OH is a $C_1$-$C_5$ hydrocarbon group comprising at least one hydroxyl group.

Non-limiting examples of monomers (OH) include, notably, hydroxyethyl (meth)acrylate, hydroxypropyl(meth)acrylate and hydroxyethylhexyl(meth)acrylate.

The monomer (OH) is most preferably selected from the group consisting of:
hydroxyethylacrylate (HEA) of formula:

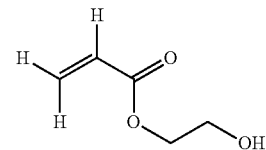

2-hydroxypropyl acrylate (HPA) of either of formulae:

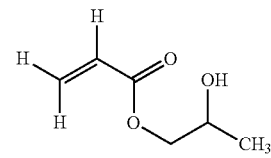

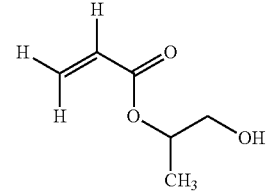

and mixtures thereof.

The polymer (FF) more preferably comprises recurring units derived from:
  (a') at least 60% by moles, preferably at least 75% by moles, more preferably at least 85% by moles of vinylidene fluoride (VDF),
  (b') optionally, from 0.1% to 15% by moles, preferably from 0.1% to 12% by moles, more preferably from 0.1% to 10% by moles of a fluorinated monomer selected from the group consisting of vinyl fluoride, chlorotrifluoroethylene (CTFE), hexafluoropropylene (HFP), tetrafluoroethylene (TFE), trifluoroethylene (TrFE), perfluoromethylvinylether (PMVE) and mixtures therefrom, and
  (c') from 0.01% to 20% by moles, preferably from 0.05% to 15% by moles, more preferably from 0.1% to 10% by moles of at least one (meth)acrylic monomer of formula (III) as defined above.

The compound (M) of formula (I) may comprise one or more functional groups on any of groups X and Y, preferably on at least one group X.

In case the compound (M) of formula (I) as defined above comprises at least one functional group, it will be designated as functional metal compound [functional compound (M)]; in case none of groups X and Y comprises a functional group, the compound (M) of formula (I) as defined above will be designated as non-functional metal compound [non-functional compound (M)].

Mixtures of one or more functional compounds (M) and one or more non-functional compounds (M) may be used in the process of the invention. Otherwise, functional compound(s) (M) or non-functional compound(s) (M) may be separately used.

The compound (M) of formula (I) is preferably of formula (I-A):

$$R^1_{4-m'}M(OR^2)_{m'} \quad \text{(I-A)}$$

wherein M is a metal selected from the group consisting of Si, Ti and Zr, $R^1$ and $R^2$, equal to or different from each other and at each occurrence, are selected from the group consisting of $C_1$-$C_{18}$ hydrocarbon groups, optionally comprising one or more functional groups, and m' is an integer comprised between 1 and 4.

Non-limiting examples of functional groups include epoxy groups, carboxylic acid groups (in acid, ester, amide, anhydride, salt or halide form), sulphonic groups (in acid, ester, salt or halide form), hydroxyl groups, phosphoric acid groups (in acid, ester, salt, or halide form), thiol groups, amine groups, quaternary ammonium groups, ethylenically unsaturated groups (like vinyl groups), cyano groups, urea groups, organo-silane groups, aromatic groups.

Should the compound (M) of formula (I) be a functional compound (M), it is preferably of formula (I-B):

$$R^3_{4-m''}M(OR^4)_{m''} \quad \text{(I-B)}$$

wherein M is a metal selected from the group consisting of Si, Ti and Zr, $R^3$, equal to or different from each other and at each occurrence, is a $C_1$-$C_{12}$ hydrocarbon group comprising one or more functional groups, $R^4$, equal to or different from each other and at each occurrence, is a $C_1$-$C_5$ linear or branched alkyl group, preferably $R^4$ is a methyl or an ethyl group, and m'' is an integer comprised between 2 and 3.

Examples of functional compounds (M) are notably vinyltriethoxysilane, vinyltrimethoxysilane, vinyltrismethoxyethoxysilane of formula $CH_2=CHSi(OC_2H_4OCH_3)_3$, 2-(3,4-epoxycyclohexylethyltrimethoxysilane) of formula:

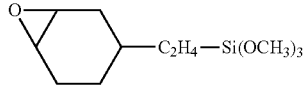

glycidoxypropylmethyldiethoxysilane of formula:
glycidoxypropyltrimethoxysilane of formula:

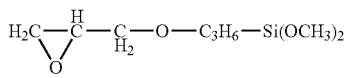

methacryloxypropyltrimethoxysilane of formula:

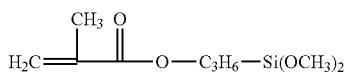

aminoethylaminpropylmethyldimethoxysilane of formula:

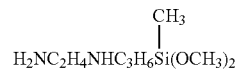

aminoethylaminpropyltrimethoxysilane of formula:

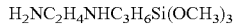

3-aminopropyltriethoxysilane, 3-phenylaminopropyltrimethoxysilane,
3-chloroisobutyltriethoxysilane, 3-chloropropyltrimethoxysilane,
3-mercaptopropyltriethoxysilane, 3-mercaptopropyltrimethoxysilane,
n-(3-acryloxy-2-hydroxypropyl)-3-aminopropyltriethoxysilane,
(3-acryloxypropyl)dimethylmethoxysilane,
(3-acryloxypropyl)methyldichlorosilane,
(3-acryloxypropyl)methyldimethoxysilane,
3-(n-allylamino)propyltrimethoxysilane,
2-(4-chlorosulfonylphenyl)ethyltrimethoxysilane,
2-(4-chlorosulphonylphenyl)ethyl trichlorosilane, carboxyethylsilanetriol,
and its sodium salts, triethoxysilylpropylmaleamic acid of formula:

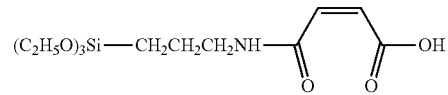

3-(trihydroxysilyl)-1-propane-sulphonic acid of formula $HOSO_2-CH_2CH_2CH_2-Si(OH)_3$, N-(trimethoxysilylpropyl)ethylene-diamine triacetic acid, and its sodium salts, 3-(triethoxysilyl)propylsuccinic anhydride of formula:

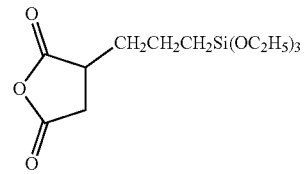

acetamidopropyltrimethoxysilane of formula $H_3C-C(O)NH-CH_2CH_2CH_2-Si(OCH_3)_3$, alkanolamine titanates of formula $Ti(A)_x(OR)_y$, wherein A is an amine-substituted alkoxy group, e.g. $OCH_2CH_2NH_2$, R is an alkyl group, and x and y are integers such that x+y=4.

Examples of non-functional compounds (M) are notably trimethoxysilane, triethoxysilane, tetramethoxysilane, tetraethoxysilane (TEOS), tetramethyltitanate, tetraethyltitanate, tetra-n-propyltitanate, tetraisopropyltitanate, tetra-n-butyltitanate, tetra-isobutyl titanate, tetra-tert-butyl titanate, tetra-n-pentyltitanate, tetra-n-hexyltitanate, tetraisooctyltitanate, tetra-n-lauryl titanate, tetraethylzirconate, tetra-n-propylzirconate, tetraisopropylzirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate.

By the term "liquid medium", it is hereby intended to denote a medium in the liquid state at 20° C. under atmospheric pressure.

Under step (i) of the process for manufacturing the composite (FH) of the invention, the compound (M) of formula (I) is partially hydrolysed and/or polycondensed, in the presence of a liquid medium, said liquid medium typically comprising water, thereby providing a pre-gel compound [compound (MP)].

The compound (MP) is typically in the form a liquid composition, said liquid composition typically comprising water.

The weight ratio of the compound (M) of formula (I) to the liquid medium is typically comprised between 50:1 and 1:50, preferably between 20:1 and 1:20, more preferably between 10:1 and 1:10.

The liquid medium may further comprise at least one acid catalyst.

The liquid medium typically further comprises from 0.5% to 10% by weight, preferably from 1% by weight to 5% by weight of at least one acid catalyst.

The selection of the acid catalyst is not particularly limited.

The acid catalyst is typically selected from the group consisting of organic and inorganic acids. The acid catalyst is preferably selected from the group consisting of organic acids.

Very good results have been obtained with citric acid.

The liquid medium may also further comprise one or more organic solvents.

Non-limiting examples of suitable organic solvents include, notably, the followings:
- aliphatic, cycloaliphatic or aromatic ether oxides, more particularly, diethyl oxide, dipropyl oxide, diisopropyl oxide, dibutyl oxide, methyltertiobutylether, dipentyl oxide, diisopentyl oxide, ethylene glycol dimethyl ether, ethylene glycol diethyl ether, ethylene glycol dibutyl ether benzyl oxide, dioxane, tetrahydrofuran (THF),
- glycol ethers such as ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol mono-n-butyl ether,
- glycol ether esters such as ethylene glycol methyl ether acetate, ethylene glycol monoethyl ether acetate, ethylene glycol monobutyl ether acetate,
- alcohols such as methyl alcohol, ethyl alcohol, diacetone alcohol,
- ketones such as acetone, methylethylketone, methylisobutyl ketone, diisobutylketone, cyclohexanone, isophorone, and
- linear or cyclic esters such as isopropyl acetate, n-butyl acetate, methyl acetoacetate, dimethyl phthalate, γ-butyrolactone.

For embodiments wherein the aqueous medium comprises one or more further organic solvents, the aqueous medium is preferably free from solvents qualified as Carcinogenic, Mutagenic or Toxic to Reproduction according to chemical safety classification (CMR solvents); more specifically, the aqueous medium is advantageously free from N-methyl-2-pyrrolidone (NMP), N,N-diethylacetamide, dimethylformamide (DMF) and N,N-dimethylacetamide (DMAC).

The liquid medium preferably further comprises at least one acid catalyst and one or more organic solvents (S).

The liquid medium more preferably further comprises at least one acid catalyst and one or more alcohols.

Under step (i) of the process for manufacturing the composite (FH) of the invention, the hydrolysis and/or polycondensation of the compound (M) of formula (I) and the polymer (FF) is usually carried out at room temperature or upon heating at a temperature lower than 100° C. The temperature will be selected having regards to the boiling point and/or stability of the aqueous medium. Temperatures comprised between 20° C. and 90° C., preferably between 20° C. and 50° C. will be preferred.

It is understood that, under step (i) of the process for manufacturing the composite (FH) of the invention, the groups Y of the compound (M) of formula (I) are partially hydrolysed and/or polycondensed in the presence of the polymer (FF) in an aqueous medium so as to yield a pre-composite [pre-composite (FP)].

As this will be recognized by the skilled in the art, the hydrolysis and/or polycondensation reaction usually generates low molecular weight side products, which can be notably water or alcohol, as a function of the nature of the compound (M) of formula (I) as defined above.

Thus, under step (i) of the process for manufacturing the composite (FH) of the invention, the aqueous medium typically further comprises one or more alcohols.

The compound (MP) is typically in the form of a liquid composition comprising one or more domains of formula —[O-MX$_{4-m*}$(OY)$_{m*-2}$]O—, wherein M is a metal selected from the group consisting of Si, Ti and Zr, X and Y, equal to or different from each other and at each occurrence, are hydrocarbon groups, optionally comprising one or more functional groups, and m* is an integer comprised between 2 and 4.

The pre-composite (FP) typically comprises one or more domains of formula —[O-M(OZ$_1$)(OZ$_2$)]O—, wherein M is a metal selected from the group consisting of Si, Ti and Zr, and Z$_1$ and Z$_2$, equal to or different from each other, are hydrocarbon groups, optionally comprising one or more functional groups, at least one of said Z$_1$ and Z$_2$ being a hydrocarbon group comprising recurring units derived from at least one monomer (OH).

In the process for manufacturing the composite (FH) of the invention, the composition provided in step (ii) is processed in molten phase at a temperature typically comprised between 100° C. and 300° C., preferably between 150° C. and 250° C.

The liquid medium provided in step (i) of the process for manufacturing the composite (FH) of the invention typically comprises from 5% to 95% by weight, preferably from 20% to 80% by weight, more preferably from 30% to 60% by weight of at least one polymer (FF), based on the total weight of said liquid medium.

The composition provided in step (ii) of the process for manufacturing the composite (FH) of the invention may further comprise at least one fluoropolymer [polymer (F)], equal to or different from the polymer (FF), preferably a non-functional fluoropolymer [non-functional polymer (F)].

For the purpose of the present invention, the term "non-functional polymer (F)" is intended to denote a fluoropolymer free from recurring units derived from at least one functional monomer such as a functional monomer comprising at least one hydroxyl group [monomer (OH)].

The selection of the non-functional polymer (F) is not particularly limited, provided that it does not interact with the pre-composite (FP) and/or the PAO of formula (II).

The composite (FH) preferably comprises, more preferably consists of:

- from 30% to 99% by weight, preferably from 50% to 95% by weight, more preferably from 60% to 90% by weight of at least one pre-composite (FP) and at least one PAO of formula (II),
- from 1% to 70% by weight, preferably from 5% to 50% by weight, more preferably from 10% to 40% by weight of at least one salt (M),
- optionally, from 1% to 60% by weight, preferably from 5% to 40% by weight, more preferably from 10% to 30% by weight of at least one polymer (F), equal to or different from the polymer (FF), and
- optionally, from 0.1% to 90% by weight of one or more inorganic fillers, wherein the amounts are based on the total weight of said composite (FH).

The salt (M) is typically provided either in powder form or as an aqueous solution comprising the same.

The nature of the salt (M) is not particularly limited.

The salt (M) is typically selected from the group consisting of MeI, $Me(PF_6)_n$, $Me(BF_4)_n$, $Me(ClO_4)_n$, Me(bis(oxalato)borate)$_n$ ("Me(BOB)$_n$"), $MeCF_3SO_3$, $Me[N(CF_3SO_2)_2]n$, $Me[N(C_2F_5SO_2)_2]_n$, $Me[N(CF_3SO_2)(RFSO_2)]_n$, wherein RF is $C_2F_5$, $C_4F_9$ or $CF_3OCF_2CF_2$, $Me(AsF_6)_n$, $Me[C(CF_3SO_2)_3]_n$ and $Me_2S_n$, wherein Me is a metal, preferably a transition metal, an alkaline metal or an alkaline-earth metal, more preferably Me being Li, Na, K or Cs, even more preferably Me being Li, and n is the valence of said metal, typically n being 1 or 2.

The salt (M) is preferably selected from the group consisting of $MeCF_3SO_3$, $Me[N(CF_3SO_2)_2]_n$, $Me[N(C_2F_5SO_2)_2]_n$, $Me[N(CF_3SO_2)(RFSO_2)]_n$, wherein RF is $C_2F_5$, $C_4F_9$ or $CF_3OCF_2CF_2$, $Me(AsF_6)_n$, $Me[C(CF_3SO_2)_3]_n$ and $Me_2S_n$, wherein Me is a metal, preferably a transition metal, an alkaline metal or an alkaline-earth metal, more preferably Me being Li, Na, K or Cs, even more preferably Me being Li, and n is the valence of said metal, typically n being 1 or 2.

The inorganic filler, if any, is typically provided in the form of particles.

The inorganic filler typically has an average particle size comprised between 0.001 μm and 1000 μm, preferably between 0.01 μm and 800 μm, more preferably between 0.03 μm and 500 μm.

Among inorganic fillers suitable for use in the invention, mention can be made of inorganic oxides, including metal oxides, metal sulphates, metal carbonates, metal sulphides and the like. Among metal oxides, mention can be made of $SiO_2$, $TiO_2$, ZnO and $Al_2O_3$.

Should the disclosure of any patents, patent applications, and publications which are incorporated herein by reference conflict with the description of the present application to the extent that it may render a term unclear, the present description shall take precedence.

The invention will be now described with reference to the following examples whose purpose is merely illustrative and not limitative of the scope of the present invention.

Raw Materials

Polymer (FF-1): VDF-HEA (0.8% by moles)-HFP (2.4% by moles) having a Melt Flow Index (MFI) of 15 g/min (2.16 Kg, 230° C.).

Polymer (FF-2): VDF-HEA (0.5% by moles)-HFP (2.2% by moles) having a Melt Flow Index (MFI) of 3.1 g/min (10 Kg, 230° C.).

PAO-1: poly(ethylene oxide) having an average molecular weight comprised between 1000000 and 1200000.

Polymer (1): VDF/HFP (93%/7% by moles) having a Melt Flow Index (MFI) of 15 g/min (2.16 Kg, 230° C.).

Determination of Ionic Conductivity

The membrane was put into a cell containing two stainless steel blocking electrodes. The cell was placed in an oven and conditioned for one hour at each temperature before measurement of the ionic conductivity.

The resistance of the membrane was measured at different temperatures. The ionic conductivity ($\sigma$) was calculated using the following equation:

$$\text{Ionic conductivity } [\sigma]=d/(R_b \times S)$$

wherein d is the thickness [cm] of the film, $R_b$ is the bulk resistance [Ω] and S is the area [cm$^2$] of the stainless steel electrode.

Manufacture of the Polymer (FF-1)

In a 80 lt. reactor equipped with an impeller running at a speed of 300 rpm were introduced in sequence 58242 g of demineralised water and 11.1 g of METHOCEL® K100 GR suspending agent. The reactor was purged with sequence of vacuum (30 mmHg) and purged of nitrogen at 20° C. Then 21.6 g of hydroxyethylacrylate (HEA) and 1873 g of hexafluoropropylene (HFP) monomers were introduced in the reactor, followed by 149.9 g of a 75% by weight solution of t-amyl perpivalate initiator in isododecane. Finally, 16597 g of vinylidene fluoride (VDF) were introduced in the reactor. The reactor was gradually heated until a set-point temperature at 57° C. and the pressure was fixed at 110 bar. The pressure was kept constantly equal to 110 bars by feeding 13 kg of aqueous solution containing a 240.6 g of HEA during the polymerization. After this feeding, no more aqueous solution was introduced and the pressure started to decrease until 80 bar. Then, the polymerization was stopped by degassing the reactor until reaching atmospheric pressure. In general a conversion around 75% of monomers was obtained. The polymer so obtained was then recovered, washed with demineralised water and oven-dried at 65° C.

Manufacture of the Polymer (FF-2)

In a 4 litres reactor equipped with an impeller running at a speed of 650 rpm were introduced in sequence 2438 g of demineralised water, 90.74 g of a solution of a sodium phosphate tribasic at a concentration of 543 mmol/kg and 59.66 g of a water solution of METHOCEL® K100 GR at a concentration of 14.2 g/kg. The reactor was purged with sequence of vacuum (30 mmHg) and purged of nitrogen at 14° C. Then 16.42 g of a solution of hydrogen peroxide at 5.1 wt % and 5.35 g of ethyl chloroformate were introduced in the reactor. After 15 minute at a speed of 880 rpm, 25.2 g of hydroxyethylacrylate (HEA) in a water solution with a concentration of HEA at 17 g/kg and 107 g of hexafluoropropylene (HFP) comonomers were introduced. Finally, 952 g of vinylidene fluoride (VDF) was introduced in the reactor. The reactor was gradually heated until a set-point temperature at 45° C. and the pressure was fixed at 120 bars. The pressure was kept constantly equal to 120 bars by feeding 605 g of aqueous solution with HEA during the polymerization. After this feeding, no more aqueous solution was introduced and the pressure started to decrease. The polymerization was stopped by degassing the reactor until reaching atmospheric pressure. A conversion at 72% of monomers was reached. The polymer so obtained was then recovered, washed with demineralised water and dried at 65° C. during all the night.

Manufacture of the Composite (FH)—General Procedure
Pre-Composite (FP) Preparation
A pre-gel compound was formed as follows:
a) in a 500 ml beaker equipped with a magnetic stirrer running at a moderated speed the following ingredients are introduced in sequence:
TEOS (tetraethyl ortosilicate): 200 g,
Water: 69.45 g (molar ratio TEOS:$H_2O$=1:4),
Ethanol: 50 g (weight ratio TEOS:EtOH=4:1),
Citric acid: 2.69 g (1 wt. % of TEOS+$H_2O$).
Theoretical amount of $SiO_2$ produced in each batch is 57.68 g (17.91% of the starting components); and
b) the system was left at room temperature for about 3 hours under vigorous stirring.

The polymer (FF) was fed to a twin screw co-rotating intermeshing extruder (Leistritz 18 ZSE 18 HP having a screw diameter D of 18 mm and a screw length of 720 mm (40 D)) from the main hopper. The extruder is equipped with a main feeder and two degassing units. The barrel is composed of eight temperature controlled zones and a cooled one (at the feeder) that allow to set the desired temperature profile. The molten polymer exits from a die, composed of two holes having each a diameter of 3 mm. Subsequently, the material is at the same time pulled by a pull roller and cooled in air just before being cut-off in pellets by the machine. Simultaneously, the pre-gel compound was also fed to the extruder through the main hopper. The composition of the pre-composite (FP) will be determined by the feeding ratio of the polymer (FF) and the pre-gel compound (see examples).

The screw profile for this step was composed of a region of conveying elements with a regular decrease of pitch (from zone 0 to 1), then a kneading block composed by two kneading elements (zone 2), then a long conveying zone (from zone 3 to 4); after this series of elements, two kneading blocks, composed by three kneading elements and alternated with two conveying elements were located (from zone 4 to 6). Finally four conveying elements and a degassing unit were situated before the die exit (zone 6 to 8). The temperature profiles used are reported in Table 1 here below. Profile A has been used for the polymers (FF-1) and (FF-2). The extruder rotation speed was 300 rpm. The pellets obtained were aged in an oven at 150° C. for 40 minutes.

TABLE 1

| Zone | 0 | 1 | 2 | 3 | 4 | 5 | 6 | 7 |
|---|---|---|---|---|---|---|---|---|
| Profile A [° C.] | 90 | 100 | 100 | 120 | 150 | 150 | 150 | 150 |

Composite (FH) Preparation

The pre-composite (FP), the PAO and a LiTFSI water solution (80% by weight) were fed to the extruder described below through the main hopper. The pellets and the PAO were charged each with a gravimetric feeder and the LiTFSI aqueous solution with a peristaltic pump.

The screw profile for this step was composed by a first conveying zone (zones 0 and 1), then a kneading block formed by three kneading elements (zone 2); after these blocks there was a long conveying zone in which the pitch of the screw is maximum (zone 3). In this zone a degassing unit, at atmospheric pressure, was present. Then, there was a kneading block composed by two kneading elements and a backflow element (zone 5). After this block the screw was composed by a conveying zone with maximum pitch (zone 6); in this zone a degassing unit at −400 mbar was present to evacuate mainly the water vapor present in the LiTFSI solution. The final part of the screw (zones 7 and 8) was composed by conveying elements.

The temperature profile B used is reported in Table 2 here below. The extruder rotation speed was 350 rpm.

TABLE 2

| Zone | 0 | 1 | 2 | 3 | 4 | 5 | 6 | 7 |
|---|---|---|---|---|---|---|---|---|
| Profile B [° C.] | 150 | 150 | 145 | 140 | 140 | 130 | 120 | 110 |

Film Extrusion of the Composite (FH)

A single screw extruder (Eurotech having a screw diameter D of 25 mm and a screw length of 75 cm) was used to prepare the films. The extruder is equipped with a main feeder. The barrel is composed of six temperature controlled zones set from 140° C. to 180° C. The molten polymer exits from a flat die of 20 cm with an opening of 0.2 mm. Subsequently, the material is pulled and pressed with a three calender system followed by a roller. The calenders were heated at 90° C. and two non-sticking support films were fed between the first two calenders to guide the extruded film of about 30-100 μm.

EXAMPLE 1

The pre-composite (FP) was manufactured at a rate for the polymer (FF-1) of 0.450 Kg/h and a rate for the pre-gel compound of 0.833 Kg/h. The nominal composition obtained was: FF-1/$SiO_2$: 75/25% wt.

Composite (FH): pre-composite (FP) 0.525 Kg/h, PAO 0.875 Kg/h and LiTFSI aqueous solution 0.4375 Kg/h.

The final composition of the composite (FH) was: 50% by weight of PAO, 22.5% by weight of polymer (FF-1), 20% by weight of LiTFSI and 7.5% by weight of $SiO_2$.

The ionic conductivity of this material was measured on a compression molded film of about 100 μm. The results are set forth in Table 3.

EXAMPLE 2

The same procedure as detailed under Example 1 was followed but using a polymer (FF-2).

The results are set forth in Table 3.

EXAMPLE 3

The same procedure as detailed under Example 1 was followed but using a pre-composite manufactured at a rate for the polymer (FF-1) of 0.525 Kg/h and a rate for the pre-gel compound of 0.417 Kg/h. The nominal composition obtained was: FF-1/$SiO_2$: 87.5/12.5% wt.

The final composition of the composite was: 50% by weight of PAO, 26.25% by weight of polymer (FF-1), 20% by weight of LiTFSI and 3.75% by weight of $SiO_2$.

The results are set forth in Table 3.

EXAMPLE 4

The same procedure as detailed under Example 3 was followed but using a pre-composite (FP) obtained from the polymer (FF-2).

This material was successfully extruded to a film thickness of 30 μm in absence of defects.

The results are set forth in Table 3.

COMPARATIVE EXAMPLE 1

The polymer (1), PAO and the LiTFSI were compounded in the following ratio: 50% by weight of PAO+30% by weight of polymer (1) and 20% by weight of LiTFSI according to the general procedure for the manufacture of the composite but without using a pre-gel compound.

The ionic conductivity of this material was measured on an extruded film of about 150 μm. The results are set forth in Table 3.

TABLE 3

| Run | Ionic conductivity [μS/cm] | | | |
|---|---|---|---|---|
| | 40° C. | 55° C. | 70° C. | 80° C. |
| Ex. 1 | 110 | 260 | 430 | — |
| Ex. 2 | 64 | 340 | 900 | 1500 |
| Ex. 3 | 90 | 630 | 500 | 1000 |
| C. Ex. 1 | 42 | 180 | 374 | 574 |

In view of the above, it has been surprisingly found that the process of the invention enables easily obtaining the composite (FH) leading to films with outstanding ionic conductivity in comparison to the films of the state of the art.

Also, it has been surprisingly found the composite (FH) of the invention can be easily processed into film separators, typically by casting extrusion. The process of the invention thus successfully enables manufacturing separators for both electrochemical devices and photo-electrochemical devices.

The invention claimed is:

1. A process for manufacturing a fluoropolymer hybrid organic/inorganic composite (FH), said process comprising:
   (i) providing a pre-composite (FP) by processing in molten phase, wherein the molten phase is processed using an extruder:
      a compound (MP) obtainable by at least partial hydrolysis and/or partial polycondensation, in the presence of a liquid medium, of at least one metal compound (M) of formula (I):

$$X_{4-m}M(OY)_m \qquad (I)$$

wherein M is a metal selected from the group consisting of Si, Ti and Zr, X and Y, equal to or different from each other and at each occurrence, are selected from hydrocarbon groups, optionally comprising one or more functional groups, and m is an integer comprised between 1 and 4, and
      at least one polymer (FF), wherein polymer (FF) is at least one functional fluoropolymer comprising at least one hydroxyl group;
   (ii) providing a composition by compounding the pre-composite (FP) provided in step (i) with:
      at least one poly(alkylene oxide) (PAO) of formula (II):

$$HO—(CH_2CHR_AO)_n—R_B \qquad (II)$$

wherein RA is a hydrogen atom or a $C_1$-$C_5$ alkyl group, $R_B$ is a hydrogen atom or a —$CH_3$ alkyl group and n is an integer comprised between 2000 and 40000,
      at least one metal salt,
      optionally, at least one fluoropolymer [polymer (F)], equal to or different from the polymer (FF), and
      optionally, one or more inorganic fillers; and
   (iii) processing in molten phase the composition provided in step (ii).

2. The process according to claim 1, wherein the polymer (FF) comprises at least 0.01% by moles of recurring units derived from at least one monomer (OH), wherein the monomer (OH) is comprised of at least one hydroxyl group.

3. The process according to claim 2, wherein the monomer (OH) is selected from the group consisting of (meth) acrylic monomers of formula (III) and vinylether monomers of formula (IV):

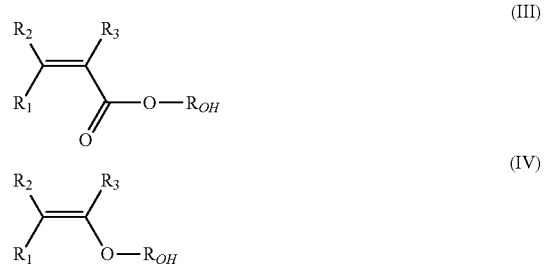

wherein each of $R_1$, $R_2$ and $R_3$, equal to or different from each other, is independently a hydrogen atom or a $C_1$-$C_3$ hydrocarbon group, and $R_{OH}$ is a $C_1$-$C_5$ hydrocarbon group comprising at least one hydroxyl group.

4. The process according to claim 2, wherein the polymer (FF) comprises at least 0.05% by moles of recurring units derived from at least one monomer (OH).

5. The process according to claim 4, wherein the polymer (FF) comprises at least 0.1% by moles of recurring units derived from at least one monomer (OH).

6. The process according to claim 1, wherein the polymer (FF) comprises at most 20% by moles, of recurring units derived from at least one monomer (OH), wherein the monomer (OH) is comprised of at least one hydroxyl group.

7. The process according to claim 6, wherein the polymer (FF) comprises at most 15% by moles of recurring units derived from at least one monomer (OH).

8. The process according to claim 7, wherein the polymer (FF) comprises at most 10% by moles of recurring units derived from at least one monomer (OH).

9. The process according to claim 1, wherein the compound (MP) is in the form of a liquid composition comprising one or more domains of formula —[O-$MX_{4-m^*}$$(OY)_{m^*-2}$]O—, wherein M is a metal selected from the group consisting of Si, Ti and Zr, X and Y, equal to or different from each other and at each occurrence, are hydrocarbon groups, optionally comprising one or more functional groups, and m* is an integer comprised between 2 and 4.

10. The process according to claim 1, wherein the pre-composite (FP) comprises one or more domains of formula —[O-M($OZ_1$)($OZ_2$)]O—, wherein M is a metal selected from the group consisting of Si, Ti and Zr, and $Z_1$ and $Z_2$, equal to or different from each other, are hydrocarbon groups, optionally comprising one or more functional groups, at least one of said $Z_1$ and $Z_2$ being a hydrocarbon group comprising recurring units derived from at least one monomer (OH).

11. A fluoropolymer hybrid organic/inorganic composite (FH)—obtainable by the process according to claim 1.

12. The composite (FH) according to claim 11, said composite (FH) comprising:
   at least one pre-composite (FP),
   at least one poly(alkylene oxide) (PAO) of formula (II):

$$HO—(CH_2CHR_AO)_n—R_B \qquad (II)$$

wherein $R_A$ is a hydrogen atom or a $C_1$-$C_5$ alkyl group, $R_B$ is a hydrogen atom or a —$CH_3$ alkyl group and n is an integer comprised between 2000 and 40000, at least one metal salt (M), optionally, at least one fluoropolymer [polymer (F)], equal to or different from the polymer (FF), and optionally, one or more inorganic fillers.

13. A process for manufacturing a film, said process comprising processing in molten phase at least one composite (FH) according to claim 12.

14. A film comprising at least one composite (FH) according to claim 12.

15. The film according to claim 14, said film being a dense film.

16. An electrochemical device or a photo-electrochemical device comprising at least one film according to claim 14.

17. The device of claim 16, wherein the film is used as a separator for the device.

18. The composite (FH) according to claim 12, wherein n is an integer comprised between 11500 and 30000.

19. The process according to claim 1, wherein n is an integer comprised between 11500 and 30000.

20. The process according to claim 1, wherein the polymer (FF) comprises at least 0.05% by moles and at most 15% by moles of recurring units derived from at least one monomer (OH), wherein the monomer (OH) is comprised of at least one hydroxyl group.

* * * * *